United States Patent
Fuller et al.

(10) Patent No.: US 9,170,574 B2
(45) Date of Patent: Oct. 27, 2015

(54) SYSTEMS AND METHODS FOR CONFIGURING A BUILDING MANAGEMENT SYSTEM

(75) Inventors: Gary Fuller, North Parramatta (AU); Kendall Paix, Koenigstein (DE); Shine Yin, Sydney (AU); John David Morrison, Mt. Colah (AU)

(73) Assignee: Honeywell International Inc., Morristown, NJ (US)

( * ) Notice: Subject to any disclaimer, the term of this patent is extended or adjusted under 35 U.S.C. 154(b) by 1115 days.

(21) Appl. No.: 12/891,505

(22) Filed: Sep. 27, 2010

(65) Prior Publication Data
US 2011/0077779 A1    Mar. 31, 2011

(30) Foreign Application Priority Data
Sep. 29, 2009    (AU) ............................... 2009904739

(51) Int. Cl.
*G06F 17/50* (2006.01)
*G05B 15/02* (2006.01)

(52) U.S. Cl.
CPC ........ *G05B 15/02* (2013.01); *G05B 2219/2642* (2013.01)

(58) Field of Classification Search
CPC ..... G06F 17/5004; G06F 17/50; G06Q 50/06; G05B 15/02
USPC .......................................................... 703/2
See application file for complete search history.

(56) References Cited

U.S. PATENT DOCUMENTS

| | | | |
|---|---|---|---|
| 4,918,615 A | 4/1990 | Suzuki et al. | |
| 5,745,126 A | 4/1998 | Jain et al. | |
| 5,751,916 A | 5/1998 | Kon et al. | |
| 5,808,905 A * | 9/1998 | Normann et al. | ............ 703/2 |
| 6,139,177 A | 10/2000 | Venkatraman et al. | |
| 6,157,943 A | 12/2000 | Meyer | |
| 6,229,429 B1 | 5/2001 | Horon | |
| 6,334,211 B1 | 12/2001 | Kojima et al. | |

(Continued)

FOREIGN PATENT DOCUMENTS

| | | |
|---|---|---|
| CA | 2538139 | 10/2005 |
| EP | 1669912 | 6/2006 |

(Continued)

OTHER PUBLICATIONS

Andover Controls, Network News, vol. 2, No. 2, 8 pages, 1997.

(Continued)

*Primary Examiner* — David Silver
(74) *Attorney, Agent, or Firm* — Seager, Tufte & Wickhem

(57) ABSTRACT

Described herein are systems and methods for configuring a BMS. In general terms, the present technology is focused on approaches for arranging and modeling building information data, particularly in terms of equipment categories and relationships between pieces of equipment, for example in the context of an HVAC system. This is advantageous in the sense that the likes of visualization, application creation, and reporting are able to be significantly streamlined. Various embodiments make use of an "equipment model", being a model which defines items for each piece of equipment in a building system based on predefined standards, thus allowing for predictable descriptions (for example in terms of data points and relationships). Some embodiments combine this with a facility model, which describes a building in spatial terms.

16 Claims, 14 Drawing Sheets

(56) References Cited

U.S. PATENT DOCUMENTS

| | | |
|---|---|---|
| 6,353,853 B1 | 3/2002 | Gravlin |
| 6,369,695 B1 | 4/2002 | Horon |
| 6,487,457 B1 | 11/2002 | Hull et al. |
| 6,580,950 B1 | 6/2003 | Johnson et al. |
| 6,598,056 B1 | 7/2003 | Hull et al. |
| 6,619,555 B2 | 9/2003 | Rosen |
| 6,741,915 B2 | 5/2004 | Poth |
| 6,796,896 B2 | 9/2004 | Laiti |
| 6,816,878 B1 | 11/2004 | Zimmers et al. |
| 6,876,951 B2 | 4/2005 | Skidmore et al. |
| 6,904,385 B1 | 6/2005 | Budike, Jr. |
| 6,993,417 B2 | 1/2006 | Osann, Jr. |
| 7,062,722 B1 | 6/2006 | Carlin et al. |
| 7,110,843 B2 | 9/2006 | Pagnano et al. |
| 7,139,685 B2 | 11/2006 | Bascle et al. |
| 7,164,972 B2 | 1/2007 | Imhof et al. |
| 7,183,899 B2 | 2/2007 | Behnke |
| 7,200,639 B1 | 4/2007 | Yoshida |
| 7,222,800 B2 | 5/2007 | Wruck |
| 7,257,397 B2 | 8/2007 | Shamoon et al. |
| 7,280,030 B1 | 10/2007 | Monaco |
| 7,292,908 B2 | 11/2007 | Borne et al. |
| 7,308,388 B2 | 12/2007 | Beverina et al. |
| 7,346,433 B2 | 3/2008 | Budike, Jr. |
| 7,383,148 B2 | 6/2008 | Ahmed |
| 7,434,742 B2 | 10/2008 | Mueller et al. |
| 7,512,450 B2 | 3/2009 | Ahmed |
| 7,516,490 B2 | 4/2009 | Riordan et al. |
| 7,548,833 B2 | 6/2009 | Ahmed |
| 7,567,844 B2 | 7/2009 | Thomas et al. |
| 7,596,473 B2 | 9/2009 | Hansen et al. |
| 7,610,910 B2 | 11/2009 | Ahmed |
| 7,626,507 B2 | 12/2009 | LaCasse |
| 7,664,574 B2 | 2/2010 | Imhof et al. |
| 7,702,421 B2 | 4/2010 | Sullivan et al. |
| 8,630,724 B2 * | 1/2014 | Hamann et al. ................. 700/31 |
| 2002/0111698 A1 | 8/2002 | Graziano et al. |
| 2003/0078677 A1* | 4/2003 | Hull et al. ......................... 700/1 |
| 2003/0083957 A1 | 5/2003 | Olefson |
| 2003/0103075 A1 | 6/2003 | Rosselot |
| 2003/0171851 A1 | 9/2003 | Brickfield et al. |
| 2003/0214400 A1 | 11/2003 | Mizutani et al. |
| 2003/0233432 A1 | 12/2003 | Davis et al. |
| 2004/0064260 A1 | 4/2004 | Padmanabhan et al. |
| 2004/0128116 A1* | 7/2004 | Normann et al. ................. 703/1 |
| 2004/0143474 A1 | 7/2004 | Haeberle et al. |
| 2004/0233192 A1 | 11/2004 | Hopper |
| 2004/0260411 A1 | 12/2004 | Cannon |
| 2005/0010460 A1 | 1/2005 | Mizoguchi et al. |
| 2005/0143863 A1 | 6/2005 | Ruane et al. |
| 2005/0267900 A1 | 12/2005 | Ahmed et al. |
| 2006/0004841 A1 | 1/2006 | Heikkonen et al. |
| 2006/0009862 A1 | 1/2006 | Imhof et al. |
| 2006/0029256 A1 | 2/2006 | Miyoshi et al. |
| 2006/0058900 A1 | 3/2006 | Johanson et al. |
| 2006/0077255 A1 | 4/2006 | Cheng |
| 2006/0077611 A1* | 4/2006 | Bender et al. ................. 361/104 |
| 2006/0265664 A1 | 11/2006 | Simons et al. |
| 2006/0279630 A1 | 12/2006 | Aggarwal et al. |
| 2007/0016955 A1 | 1/2007 | Goldberg et al. |
| 2007/0114295 A1 | 5/2007 | Jenkins |
| 2007/0237361 A1 | 10/2007 | Sandor et al. |
| 2008/0036593 A1 | 2/2008 | Rose-Pehrsson et al. |
| 2008/0062167 A1 | 3/2008 | Boggs et al. |
| 2008/0144885 A1 | 6/2008 | Zucherman et al. |
| 2008/0198231 A1 | 8/2008 | Ozdemir et al. |
| 2008/0224862 A1 | 9/2008 | Cirker |
| 2008/0320552 A1 | 12/2008 | Kumar et al. |
| 2009/0157744 A1 | 6/2009 | McConnell |
| 2009/0160673 A1 | 6/2009 | Cirker |
| 2010/0048167 A1 | 2/2010 | Chow et al. |
| 2010/0156628 A1 | 6/2010 | Ainsbury et al. |
| 2010/0156630 A1 | 6/2010 | Ainsbury |
| 2011/0077754 A1 | 3/2011 | Jones et al. |
| 2011/0083094 A1 | 4/2011 | Laycock et al. |

FOREIGN PATENT DOCUMENTS

| | | |
|---|---|---|
| JP | 7085166 | 3/1995 |
| JP | 11024735 | 1/1999 |
| JP | 11317936 | 11/1999 |
| JP | 2001356813 | 12/2001 |
| JP | 2005242531 | 9/2005 |
| JP | 2005311563 | 11/2005 |
| WO | 9621264 | 7/1996 |
| WO | 2004029518 | 4/2004 |
| WO | 2005045715 | 5/2005 |
| WO | 2008157755 | 12/2008 |
| WO | 2009079648 | 6/2009 |
| WO | 2010106474 | 9/2010 |

OTHER PUBLICATIONS

Andover Controls, World, 4 pages, Spring 1997.
Cadgraphics, "The Cadgraphics User's Guide," 198 pages, 2003.
Carrier Comfort Network CCN Web, "Web Browser User Interface to the Carrier Comfort Network," 2 pages, 2002.
Carrier Comfort Network CCN Web, Overview and Configuration Manual, 134 pages, Apr. 2006.
Carrier Comfort Network CCN Web, Product Data, 2 pages, Apr. 2006.
Carrier, "i-Vu Powerful and Intuitive Front End for Building Control," 2 pages, Aug. 2005.
Carrier, "i-Vu Web-Based Integrated Control System," 3 pages, 2005.
Carrier, Demo Screen Shots, 15 pages, prior to Aug. 27, 2007.
Carrier, i-Vu CCN 4.0, Owner's Guide, 20 pages, Jul. 2007.
Carrier, i-Vu CCN, 7 pages, 2007.
Circon, "i-Browse Web-Based Monitoring and Control for Facility Management," 2 pages, prior to Aug. 27, 2007.
Echelon, "Energy Control Solutions with the i.Lon SmartServer," 4 pages, 2007.
Echelon, "i.Lon 100e3 Internet Server Models 72101R-300, 72101R-308, 72102R-300, 72103-R300 . . . " 5 pages, copyright 2002-2007.
Echelon, "i.Lon 100e3 Internet Server New Features," 15 pages, Sep. 2006.
Echelon, "i.Lon SmartServer," 5 pages, 2007.
Honeywell News Release, "Honeywell's New Sysnet Facilities Integration System for Boiler Plant and Combustion Safety Processes," 4 pages, Dec. 15, 1995.
Honeywell, "Introduction of the S7350A Honeywell WebPAD Information Appliance," Home and Building Control Bulletin, 2 pages, Aug. 29, 2000; Picture of WebPad Device with touch screen, 1 Page; and screen shots of WebPad Device, 4 pages.
Honeywell, Excel 15B W7760B Building Manager Release 2.02.00, Installation Instructions, 28 pages, Dec. 2004.
Honeywell, The RapidZone Solution, Excel 5000 Open System, Application Guide, 52 pages, Jan. 2004.
http://pueblo.lbl.gov/~olken . . . , "Remote Building Monitoring and Operations Home Page," 5 pages, prior to Aug. 27, 2007.
http://www.commercial.carrier.com/commercial/hvac/productdescription . . . , "Carrier: i-Vu CCN," 1 page, printed Mar. 11, 2008.
http://www.commercial.carrier.com/commercial/hvac/productdescription . . . , "Carrier: 33CSCCNWEB-01 CCN Web Internet Connection to the Carrier Comfort Network," 1 page, printed Mar. 11, 2008.
http://www.docs.hvacpartners.com/idc/groups/public/documents/techlit/gs-controls-ivuccn.rtf, "Products," 5 pages, printed Jul. 3, 2007.
http://www.lightstat.com/products/istat.asp, Lightstat Incorporated, "Internet Programmable Communicating Thermostats," 1 page, printed Mar. 13, 2007.
http://www.sharpsystems.com/products/pc_notebooks/actius/rd/3d/, "Actius RD3D Desktop Replacement Notebook with Industry-Breakthrough 3D Screen," Sharp, 1 page, printed Jun. 16, 2005.
http://www2.sims.berkeley.edu/courses/is213/s06/projects/lightson;final.html, "Lights on a Wireless Lighting Control System," 11 pages, printed Mar. 22, 2007.
i.Lon 100e3 Internet Server, 1 page, prior to Aug. 27, 2007.

(56) References Cited

OTHER PUBLICATIONS i.Lon, SmartServer, 2 pages, prior to Aug. 27, 2007.
i-stat, Demo Screen Shots, 9 pages, printed Mar. 13, 2007.
i-stat, The Internet Programmable Thermostat, 2 pages, prior to Aug. 27, 2007.
Johnson Controls, Network Integration Engine (NIE) 3 pages, Nov. 9, 2007.
Johnson Controls, Network Integration Engine (NIE), Product Bulletin, pp. 1-11, Jan. 30, 2008.
Narang, "WEBARC: Control and Monitoring of Building Systems Over the Web," 53 pages, May 1999.
Olken et al., "Object Lessons Learned from a Distributed System for Remote Building Monitoring and Operation," ACM SIGPLAN Notices, vol. 33, No. 10, pp. 284-295, Oct. 1998.
Proliphix, Inc., "Proliphix IP Devices: HTTP API," 28 pages, Jan. 23, 2006.
Proliphix, Inc., Remote Management User Guide, 12 pages, prior to Aug. 27, 2007.
Sharp, "Actius AL3DU 3D LC Display High Performance 3D Visualization," 2 pages, prior to Mar. 17, 2006.
So et al., "Building Automation on the Information Superhighway," ASHRAE (American Society of Heating Refrigerating, and Air Conditioning) Transactions, vol. 104, Part 2, pp. 176-191, 1998.
So et al., "Building Automation Systems on the Internet," Facilities vol. 15, No. 5/6, pp. 125-133, May/Jun. 1997.
Talon, "Raptor Controller," 6 pages, Oct. 2003.
Talon, "Workstation Software," 4 pages, Nov. 2002.
Honeywell, "Excel Building Supervisor-Integrated R7044 and FS90 Ver. 2.0," Operator Manual, 70 pages, Apr. 1995.
Trane, "System Programming, Tracer Summit Version 14, BMTW-SVP01D-EN," 623 pages, 2002.
European Search Report for EP Application No. 10178880.9, dated May 13, 2014.
Office Action in Chinese for related Chinese Application No. 201010600624.9, dated Nov. 17, 2014.
Translation of Office Action for related Chinese Application No. 201010600624.9, dated Nov. 17, 2014.
Office Action in Chinese for related Chinese Application No. 201010600624.9 dated Mar. 23, 2015.
Translation of Office Action for related Chinese Application No. 201010600624.9, dated Mar. 23, 2015.

* cited by examiner

- Facility
  - Building
    - Level 1
      - North East Comfort Zone
      - North West Comfort Zone
      - South Comfort Zone
      - South East Comfort Zone
      - South West Comfort Zone
    - Level 2
      - North East Comfort Zone
      - North West Comfort Zone
      - South Comfort Zone
      - South East Comfort Zone
      - South West Comfort Zone

- HVAC Supply Zones
  - HVAC supply zone west
    - Level 1
      - North West Comfort Zone
      - South West Comfort Zone
    - Level 2
      - North West Comfort Zone
      - South West Comfort Zone
  - HVAC supply zone east
    - Level 1
      - South Comfort Zone
      - South East Comfort Zone
      - South West Comfort Zone
    - Level 2
      - South Comfort Zone
      - South East Comfort Zone
      - South West Comfort Zone

FIG. 5

- Facility
  - Building
    - Level 1
      - HVAC supply zone west
        - North West Comfort Zone
        - South West Comfort Zone
      - HVAC supply zone east
        - South Comfort Zone
        - South East Comfort Zone
        - South West Comfort Zone
    - Level 2
      - HVAC supply zone west
        - North West Comfort Zone
        - South West Comfort Zone
      - HVAC supply zone east
        - South Comfort Zone
        - South East Comfort Zone
        - South West Comfort Zone

FIG. 6

+ Equipment
　+ Air Handling Unit East
　　+ VAV North East
　　+ VAV South
　　+ VAV South East
　+ Air Handling Unit West
　　+ VAV Noth West
　　+ VAV South West

FIG. 10

- Equipment
  - East Boiler Set
    - Air Handling Unit East
      - VAV North East
      - VAV South
      - VAV South East
  - East Chiller
    - Air Handling Unit East
      - VAV North East
      - VAV South
      - VAV South East
  - West Boiler Set
    - Air Handling Unit West
      - VAV Noth West
      - VAV South West
  - West Chiller
    - Air Handling Unit West
      - VAV Noth West
      - VAV South West

FIG. 11

- Equipment
  - Air Distribution System
    - Air Handling Unit East
      - VAV North East
      - VAV South
      - VAV South East
    - Air Handling Unit West
      - VAV Noth West
      - VAV South West
  - Hot Water System
    - East Boiler Set
    - West Boiler Set
  - Chilled Water System
    - East Chiller
    - West Chiller

FIG. 12

SYSTEMS AND METHODS FOR CONFIGURING A BUILDING MANAGEMENT SYSTEM

This application claims the benefit of Australian Provisional Patent Application No. 2009904739, filed Sep. 29, 2009, and entitled "SYSTEMS AND METHODS FOR CONFIGURING A BUILDING MANAGEMENT SYSTEM," which is hereby incorporated by reference.

FIELD OF THE INVENTION

The present invention relates to building management systems, and more particularly to systems and methods for configuring a building management system. In particular, some embodiments include building management systems themselves, and/or methods associated with the configuration and/or implementation of building management systems.

Embodiments of the invention have been particularly developed for providing a domain aware model, thereby to allow automated visualization, and additionally to streamline the manner in which applications are designed. Although the invention is described hereinafter with particular reference to such applications, it will be appreciated that the invention is applicable in broader contexts.

BACKGROUND

Any discussion of the prior art throughout the specification should in no way be considered as an admission that such prior art is widely known or forms part of common general knowledge in the field.

A building management system (BMS) is an IT component used to assist in the monitoring and management of various components within a building. Traditionally, the focus of BMS technology has been HVAC management, although it is also common for a BMS to have functionalities extending to other systems such as security, fire, and the like.

The configuration of a BMS is a complex process, requiring a great deal of engineering. Unfortunately, much of the contextual information collected during that engineering is inherently lost, for example context surrounding the nature, purpose and/or location of physical devices (for example binary/analogue inputs and outputs). This has unfortunate downstream consequences in terms of system adaptability, and the complexity of applications written to interact with the system.

It follows that there is a need in the art for improved systems and methods for managing building control systems.

SUMMARY

It is an object of the present invention to overcome or ameliorate at least one of the disadvantages of the prior art, or to provide a useful alternative.

One embodiment provides a method for configuring a building management system (BMS), the method including:
providing a repository of equipment model standards, wherein each standard is configured to describe a category of equipment in a building system, one or more data points associated with a piece of equipment belonging to that category, the roles of those data points, and relationships with other pieces of equipment;
allowing a user to define a plurality of equipment model items using the repository of equipment model standards, such that each equipment model item describes a specific piece of equipment as required by the standard; and
constructing an equipment model including the defined equipment model items, wherein the equipment model allows for automated visualisation of the items in terms of location and relationships.

One embodiment provides a method wherein the relationships with other pieces of equipment are defined in terms of reliance relationships and containment relationships.

One embodiment provides a method wherein, for at least one category of equipment, the standard is configured to additionally describe a serviced area, wherein the serviced area is additionally defined in a facility model for the BMS that describes physical locations.

One embodiment provides a method wherein the equipment model standards include a plurality of HVAC standards for respectively describing categories of equipment in an HVAC system.

One embodiment provides a method wherein for at least one category of equipment in the HVAC system, the standard is configured to additionally describe a region uniquely serviced by the piece of equipment.

One embodiment provides a BMS including:
data indicative of plurality of equipment model items, these items being created using standards the repository of equipment model standards, such that each equipment model item describes a specific piece of equipment in terms of the category of equipment, one or more data points associated with a piece of equipment belonging to that category, the roles of those data points, and relationships with other pieces of equipment; and
a visualisation module for automated visualisation of the items in terms of location and relationships.

One embodiment provides a BMS wherein the relationships with other pieces of equipment are defined in terms of reliance relationships and containment relationships.

One embodiment provides a BMS wherein, for at least one category of equipment, the standard is configured to additionally describe a serviced area, wherein the serviced area is additionally defined in a facility model for the BMS that describes physical locations.

One embodiment provides a BMS wherein the equipment model standards include a plurality of HVAC standards for respectively describing categories of equipment in an HVAC system.

One embodiment provides a BMS wherein for at least one category of equipment in the HVAC system, the standard is configured to additionally describe a region uniquely serviced by the piece of equipment.

One embodiment provides a method for modelling an HVAC system, the method including:
providing a facility model, which includes data indicative of a plurality of facility model items which respectively describe physical locations within a building environment in terms of the category of location, and relationships with other locations, wherein a category of facility model items describe locations uniquely serviced by respective pieces of HVAC equipment; and
providing an equipment model, which includes data indicative of plurality of equipment model items, each equipment model item describing a specific piece of HVAC equipment in terms of the category of equipment, one or more data points associated with that piece of equipment, the roles of those data points, and relationships with other pieces of equipment, wherein for at least one category of equipment the equipment model items include data indicative of a location uniquely serviced by that piece of equipment;

such that the facility model and equipment model are linked by the locations uniquely serviced by respective pieces of HVAC equipment.

One embodiment provides a method wherein the relationships with other pieces of equipment are defined in terms of reliance relationships and containment relationships.

One embodiment provides a method including a step of providing an automated visualisation of the HVAC system based on information in the facility model and equipment model.

One embodiment provides a BMS including:

data indicative of a plurality of facility model items which respectively describe physical locations within a building environment in terms of the category of location, and relationships with other locations, wherein a category of facility model items describe locations uniquely serviced by respective pieces of HVAC equipment; and data indicative of plurality of equipment model items, each equipment model item describing a specific piece of HVAC equipment in terms of the category of equipment, one or more data points associated with that piece of equipment, the roles of those data points, and relationships with other pieces of equipment, wherein for at least one category of equipment the equipment model items include data indicative of a location uniquely serviced by that piece of equipment;

such that the facility model and equipment model are linked by the locations uniquely serviced by respective pieces of HVAC equipment.

One embodiment provides a BMS wherein the relationships with other pieces of equipment are defined in terms of reliance relationships and containment relationships.

One embodiment provides a BMS including a component for providing an automated visualisation of the HVAC system based on information in the facility model and equipment model.

One embodiment provides a hardware component configured device configured to perform a method as described herein.

One embodiment provides a computer program product configured device configured to perform a method as described herein.

One embodiment provides a carrier medium carrying computer executable code that, when executed on one or more processors, cause the performance of a method as described herein.

Reference throughout this specification to "one embodiment" or "an embodiment" or "some embodiments" means that a particular feature, structure or characteristic described in connection with the embodiment is included in at least one embodiment of the present invention. Thus, appearances of the phrases "in one embodiment" or "in an embodiment" or "in some embodiments" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

BRIEF DESCRIPTION OF THE DRAWINGS

Embodiments of the invention will now be described, by way of example only, with reference to the accompanying drawings in which:

FIG. 5 shows a tree structure representing a model according to one embodiment.

FIG. 6 shows a tree structure representing a model according to one embodiment.

FIG. 10 shows a tree structure representing a model according to one embodiment.

FIG. 11 shows a tree structure representing a model according to one embodiment.

FIG. 12 shows a tree structure representing a model according to one embodiment.

DETAILED DESCRIPTION

Figure 1:
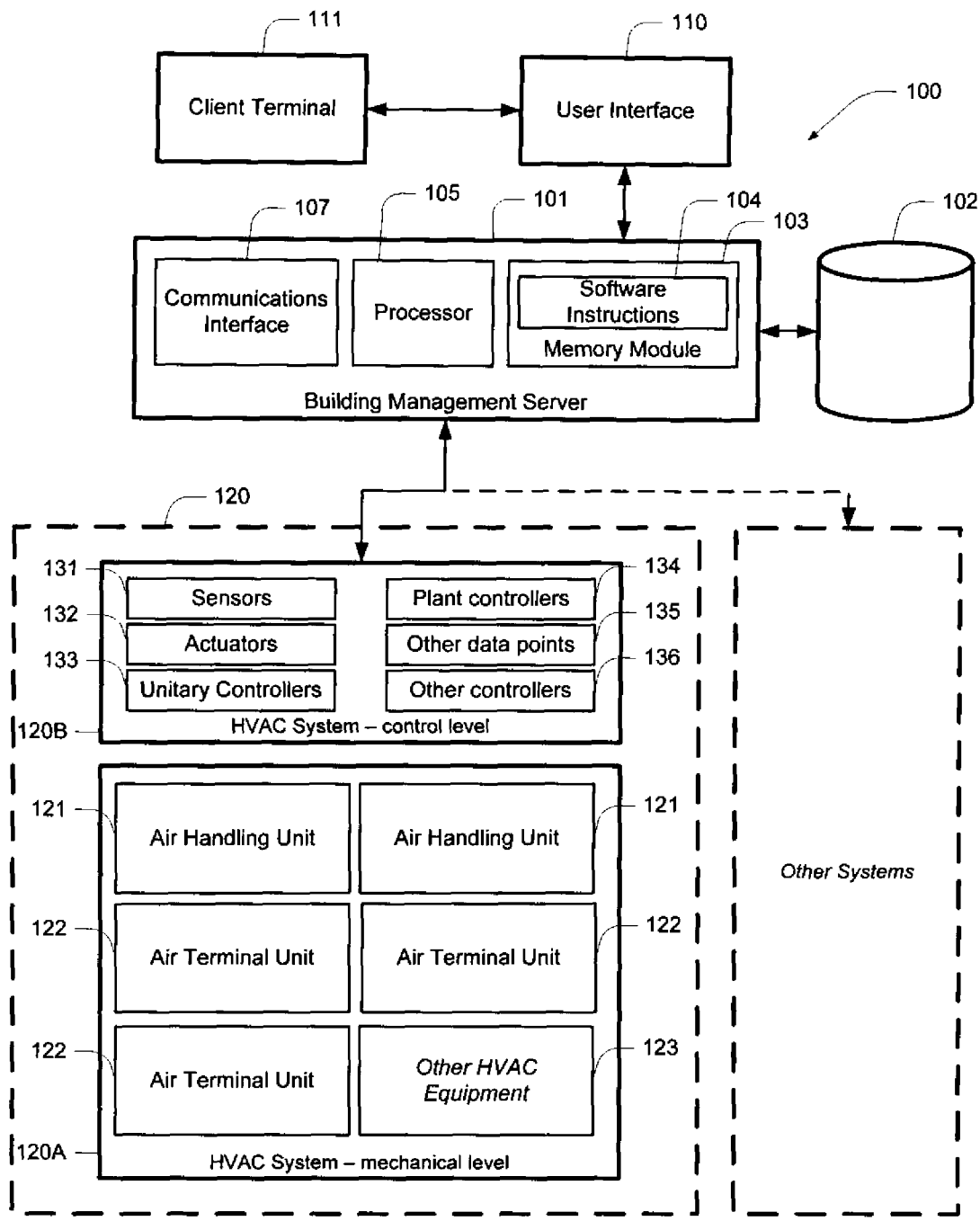
FIG. 1 schematically illustrates a system according to one embodiment.
Figure 2:
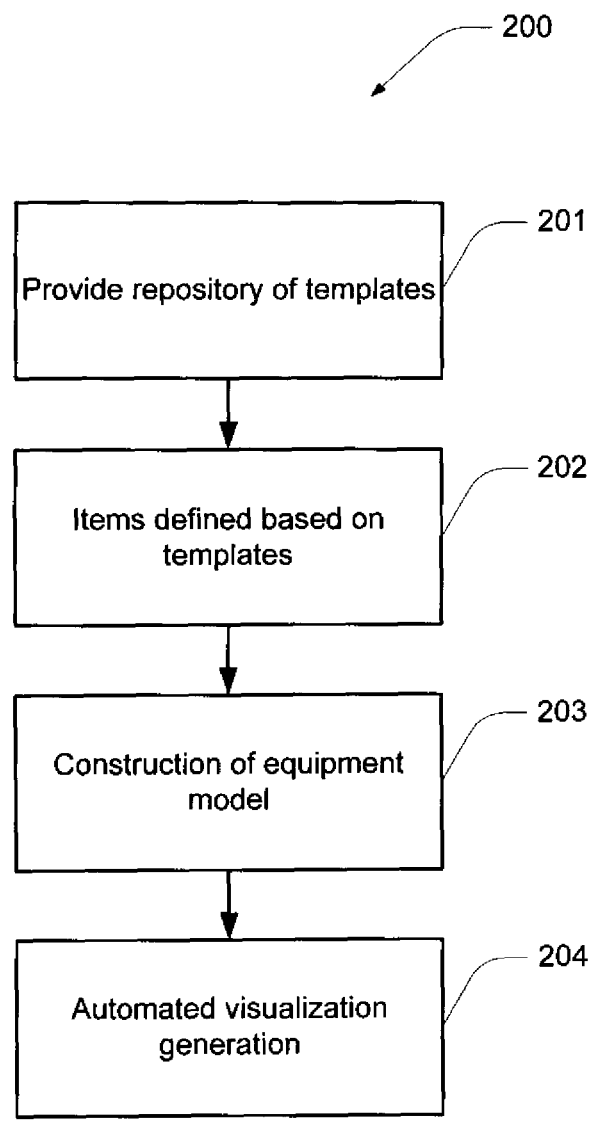
FIG. 2 illustrates a method according to one embodiment.

Described herein are systems and methods for configuring a BMS. In general terms, the present technology is focused on approaches for arranging and modeling building information data, particularly in terms of equipment categories and relationships between pieces of equipment, for example in the context of an HVAC system. This is advantageous in the sense that the likes of visualization, application creation, and reporting are able to be significantly streamlined. Various embodiments make use of an "equipment model", being a model which defines items for each piece of equipment in a building system based on predefined standards, thus allowing for predictable descriptions (for example in terms of data points and relationships). Some embodiments combine this with a facility model, which describes a building in spatial terms.

The present concepts are described by particular reference to HVAC systems. However, this is not intended to be necessarily limiting, and other embodiments use the present concepts in terms of other building systems which are managed via a BMS. As used herein, the term BMS should be afforded a broad interpretation, to define substantially any IT component that is configured for managing building systems, including the likes of HVAC, lighting, perimeter intrusion, and so on.

General Overview and Context

When configuring a HVAC system, an engineer often understands the problem domain in terms of control strategies, controllers and plant equipment. This domain knowledge is engineering specific and complex. On the other hand, when a BMS is being configured, that configuration should be mindful of operator tasks and goals.

The engineering and operational views of a HVAC system share many concepts, however, the operational view is primarily concerned with occupant comfort and maintaining the correct conditions, whereas the engineering view is about facilitating that requirement.

Some building management systems make use of a facility model, which allows modeling of a facility in spatial terms (for example in terms of buildings, levels, rooms, etc), thereby to help the operator quickly understand, navigate and manage the system. However, in conventional situations, the HVAC system knowledge is built into custom graphics for each individual implementation. The fact that there is, for example, one air handling unit serving the east side of a building is only known because, during engineering, a technician physically represented this information into a graphic thereby to provide a visualization for an end user. Such information is not inherently known in the system. Further to this, the individual data points in a given system are meaningless without graphical context or a strong well known naming convention (and such conventions tend to vary from site to site and implementation to implementation).

The present disclosure deals with modeling approaches in the context of a BMS, with particular focus on a HVAC system. In some embodiments a facility model and an equipment model are used together to provide a BMS having has a level of self-awareness that can be used to provide the information needed by operators without the need to engineer complex custom graphics for the purposes of visualization.

System Level Overview

FIG. 1 illustrates a BMS 100 according to one embodiment. It will be appreciated that this is a relative simplistic schematic illustration, intended to illustrate some key features and functionalities.

BMS 100 is defined by both hardware and software components. For example, BMS 100 includes a central BMS server 101 which operates in conjunction with a database 102. Server 101 includes a memory module 103 which maintains software instructions 104 executable on a processor 105, thereby to allow the server to perform various BMS functionalities. For example, these software instructions define some or all of a computer program product in the form of a BMS software application. BMS 101 includes communication interfaces 107 (such as Ethernet and other interfaces) for enabling communication with a plurality of building components, and with client terminals.

Although FIG. 1 illustrates server 101 as a single component, in some embodiments server 101 is defined by a plurality of distributed hardware and/or software components. Furthermore, various other IT components (such as routers, switches, etc) are omitted for the sake of simplicity.

Server 101 provides a user interface 110. In the present embodiment, a user interacts with the user interface via a client terminal 111. For example, module 110 is presented as a web-based interface by server 101, and a user of client terminal 111 accesses this interface using a web-browser application. In other embodiments proprietary software is locally installed at client terminal 111.

A key functionality provided by way of the user interface is visualization of a HVAC system, illustrated as HVAC system 120. The generation of visualizations is automated based on modeling discussed further below. In overview, a user of terminal 111 provides via interface 110 a request for information regarding HVAC system 120, and based on data maintained within database 102 regarding components within that HVAC system, server 101 is able to generate and deliver to the client via interface 110 a visualization of system 120. This is discussed in more detail further below. However, as a general overview, the technology disclosed herein makes use of an equipment model, which describes HVAC components in a predetermined manner based on predefined standards, optionally in combination with a facility model, which provides spatial information regarding the building (or buildings) which the HVAC components service.

In the present example, HVAC system 120 includes various pieces of equipment, including air handling units 121 and air terminal units 122, and other pieces of equipment 123. These are conceptually defined at a mechanical level 120A, in the sense that they are mechanical equipment. HVAC system 120 also includes a control level 120B, which includes the likes of sensors 131, actuators 132, unitary controllers 133, plant controllers 134, other data points 135, and other controllers 136. These collectively define the HVAC system as viewed by a BMS in terms of IT infrastructure. Each piece of equipment includes (or is related to) infrastructure from the control level. For example, each piece of equipment includes (or is at a practical level related to) none or more data points. These data points are individual inputs and outputs (binary and/or digital) which, for example, feed data values (such as temperature and/or humidity values) into BMS 100.

From a terminology (and practical) perspective, an Air Handling Unit (AHU) is a device used to condition and circulate air as part of a HVAC system. The term "unitary HVAC equipment" describes a piece of HVAC equipment that is usually distributed away from larger centrally located HVAC equipment, and provides localized control of air delivery for a HVAC comfort zone. Examples include a VAV terminal unit (variable air volume terminal unit—a piece of unitary HVAC equipment where air supply is controlled (typically) by a mechanical baffle) or a FCU (Fan Coil Unit—a piece of unitary HVAC equipment where a fan blows air through a heating (sometimes cooling) coil). The term ATU is used herein to describe an Air Terminal Unit, being a generic name for unitary HVAC equipment that controls the final delivery of air to a HVAC controlled zone (such as a VAV terminal unit, or FCU). An AHU system is comprised of one AHU and zero or more physically linked ATUs.

Method Overview

FIG. 1 illustrates a method 200 according to one embodiment. Block 201 represents a process for providing a repository of equipment model standards. At a general level, these standards are made available for an engineer or technician to use during configuration of a BMS. In the present embodiment, each standard is configured to describe:

A category of equipment in a building system. In the present embodiment, the building system is an HVAC system, and a standard is defined for each category of equipment in the HVAC system (for example a standard for an AHU or ATU). In some cases the standards are specific to particular pieces of unitary HVAC equipment. Each piece of equipment requires the ability to identify its type to the system. In some embodiments, each equipment item includes a custom parameter for maintaining data indicative of equipment category. This information can then be used to build reports or groups of equipment for energy management reasons.

One or more data points associated with a piece of equipment belonging to that category. For example, equipment belonging to a particular category is known to have certain data points (i.e. particular types of binary/analogue inputs/outputs).

The roles of the one or more data points referred to in the above bullet point.

Relationships with other pieces of equipment. For example, these may be defined in terms of containment relationships (a given piece of equipment contains another, or is contained by another) and/or reliance relationships (a given piece of equipment relies upon another, or vice versa). In terms of a HVAC system, reliance relationships are defined in terms of "supply" relationships. For example, a given ATU is supplied by a specific AHU.

The location of the piece of equipment, for example my reference to a facility model (discussed below).

In relation to the roles of data points (also referred to as "point roles"), the present technology recognizes that providing meaningful context to data points is crucial in providing a system with inherent context and understandability. When defining a control strategy for a HVAC system, the building management system and its operators must be considered, as individual sensor and actuator values are exposed to them and should be able to be understood given the current context. In order to standardize and simplify the understanding of equipment and equipment systems, the concept of a "point role" is critical. Consider a BACnet Analog Output called "CP-AO1". The name of this point and, for example, a value it provides (e.g a "PresentValue" of "24.50"° C.), is meaningless unless some context is provided. Point-roles provide this context. By using a predefined point role in the standard, for example "Supply Air Temperature Sensor" as the point role, the value 24.50° C. starts to have meaning This point is associated with a given air handling unit defined in the equipment model, and a building operator can make decisions as to whether a value is appropriate based on in inherent context. The categorization of points not only helps better visualize a piece of equipment, it allows the building management system more understanding and awareness of the information it is monitoring and controlling.

Block 202 represents the bulk of the configuration process, whereby a user is allowed (i.e. provided with tools) to define a plurality of equipment model items using the repository of equipment model standards. As used herein, the term "item" is used to define an entry created by assigning physical values to a standard, thereby to describe a particular instance of physical equipment. That is, each equipment model item describes a specific piece of equipment as required by the standard. For example, an equipment model item is defined for each AHU, ATU, and so on. Block 203 represents constructing an equipment model including the defined equipment model items. In some cases this includes loading the item data into database 102 for allowing the subsequent construction/instantiation of the equipment model.

The present approach is particularly significant in that the equipment model items allow a model to retain contextual data that is typically lost in the engineering process. In particular, the BMS has an inherent understanding about the physical system in terms of the types of equipment, and their relationships at a general level. Simple queries may be engineered such as "how many ATUs are in the system" and "which ATUs are supplied by this specific AHU". It will be appreciated that this sort of framework abstracts a HVAC system away from being a collection of data points, and allows for flexibility in terms of system expansion (adding further equipment model items simply adds to the model), and allows significant improvements in terms of application design (applications can be designed to call on data points based on their context, without needing to know anything precise about the individual points). Furthermore, as discussed herein, the equipment model allows for automated visualization of the items in terms of location and relationships. This is represented in block 204. As a general overview, the BMS is configured to understand how various categories of equipments fit together in terms of a visualization, and constructs such a visualization using the equipment model items in database 102.

Point roles are crucial in terms of allowing automated visualization. In particular, user interface components are configured for building displays based on model data. Each item in an equipment model is, in the present embodiment, defined based on a standard, and in this manner includes predictable point roles for each data point. This allows a user interface component to inherently understand what a particular value describes (by its point role), and therefore appropriate position and display that value in an automated visualization.

In terms of the model, for at least one category of equipment, the standard is configured to additionally describe a serviced area, wherein the serviced area is additionally defined in a facility model for the BMS that describes physical locations. In the present example, the notion of an HVAC comfort zone is used. In practical terms, each equipment model describing an AHU is configured to maintain data indicative of a comfort zone serviced by that AHU. This provides an important link between the equipment model (which is primarily focused on the interaction between HVAC equipment) and a facility model (which describes a building or set of buildings from a spatial perspective. This is discussed in greater detail below.

Modeling Spaces in an HVAC System

In overview, some embodiments of the present invention operate in conjunction with a facility model, which includes data indicative of a plurality of facility model items (much like the equipment model includes equipment model items). The facility model items respectively describe physical locations within a building environment in terms of the category of location, and relationships with other locations. For example, facility model items may describe the likes of towers, floors, rooms, and so on. The crux of this model is to provide context in a BMS such that it inherently understand such concepts, and is able to respond to queries such as "how many rooms are there on level X" and the like.

As a general comment, the facility model organizes the physical locations of a site in a manner that produces quick maneuverability and assessment of key entities and processes. Blocks, floors, departments or sections of a site can be logically grouped to form a meaningful tree that models what the building(s) represents in real life. One key goal of a HVAC system operator is to be able to monitor and control the conditions of the building spaces. To help enable this goal the facility model should be engineered to represent the physical topology of the facility and contains a number of key entities:

Building: Each building in the facility can be represented as a single entity and contains at least one level.

Level: A level in the building encompasses an entire single horizontal space bounded by the perimeter walls of the building.

Room (optional): A room exists within a building and is a single space bounded by walls (internal or building perimeter). A room is normally created to help provide meaningful navigation of the system or for Scope of Responsibility reasons.

Area (optional): An area can exist within a level or outside the building to represent a physical space that is considered to be distinct from other areas. An area is normally created to help provide meaningful navigation of the system or for Scope of Responsibility reasons.

At least one category of facility model item describes locations uniquely serviced by respective pieces of HVAC equipment. In the present embodiment, this includes the "comfort zone" described above. In this manner, a comfort zone is defined in terms of its relationship to a HVAC system (i.e. which ATU services it) and its relationship in terms of space (i.e. which physical area or areas of the building it covers). As such, such that the facility model and equipment model are linked by these comfort zones, being locations uniquely serviced by respective pieces of HVAC equipment.

Embodiments described herein include both HVAC comfort zones and HVAC supply zones. A HVAC supply zone consists of all the areas of a building that are serviced by a single HVAC System. A HVAC System includes the hot water, chilled water, air handling, exhaust fan and secondary pump systems. A HVAC supply zone may span buildings, levels, tenants or organizations in a building, for example the east and west sides of a multi-story building may be supplied by separate air handling systems or the hot water system may supply all buildings in a facility. The HVAC supply zone concept exposes the direct relationship between areas within a building (including the facility model locations and the physical locations not identified in the facility model) and HVAC systems. These relationships are used to help diagnose and maintain a building. Some practical examples of the use of HVAC supply zone are:

Respond to occupant request: If an area in a building is being reported as uncomfortable, the building operator could examine the different HVAC systems that are servicing that area to determine if there is a problem with the associated Hot Water, Chilled Water, Air Handling, Exhaust Fan and Secondary Pump Systems.

Maintaining a HVAC system: When a boiler system needs to be shutdown for maintenance, knowing the HVAC supply zone of the boiler allows the building manager to appropriately schedule the maintenance such that the least impact is felt on the building occupants.

Figure 3:
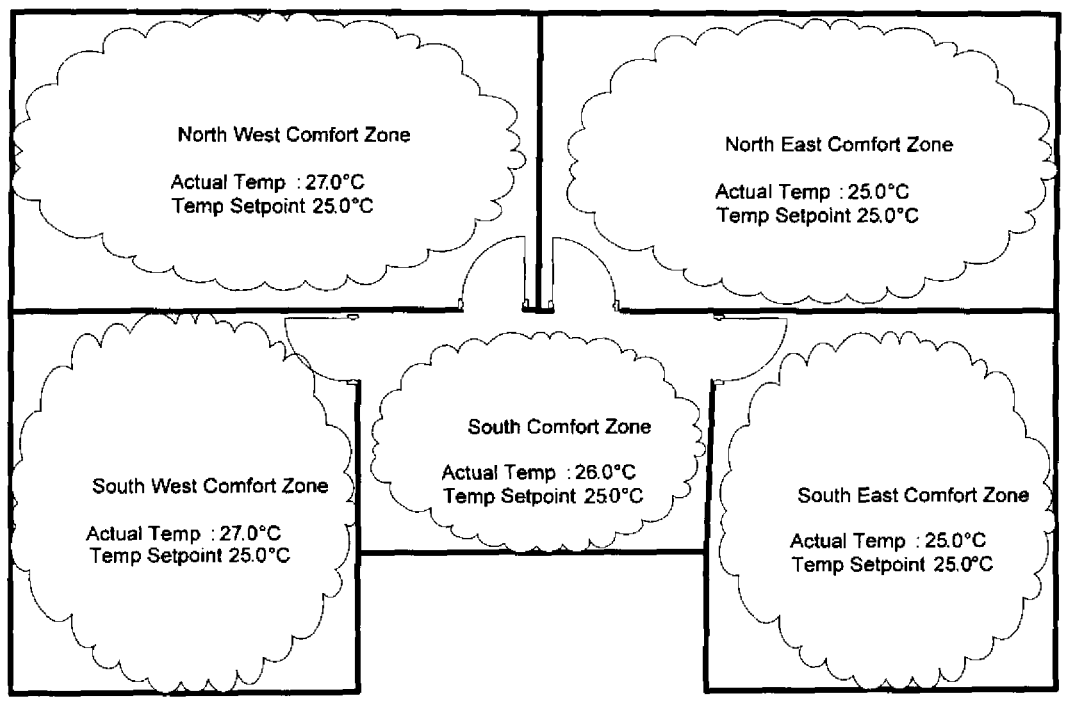
FIG. 3 provides a graphical overview of comfort zones according to one embodiment.
Figure 4:
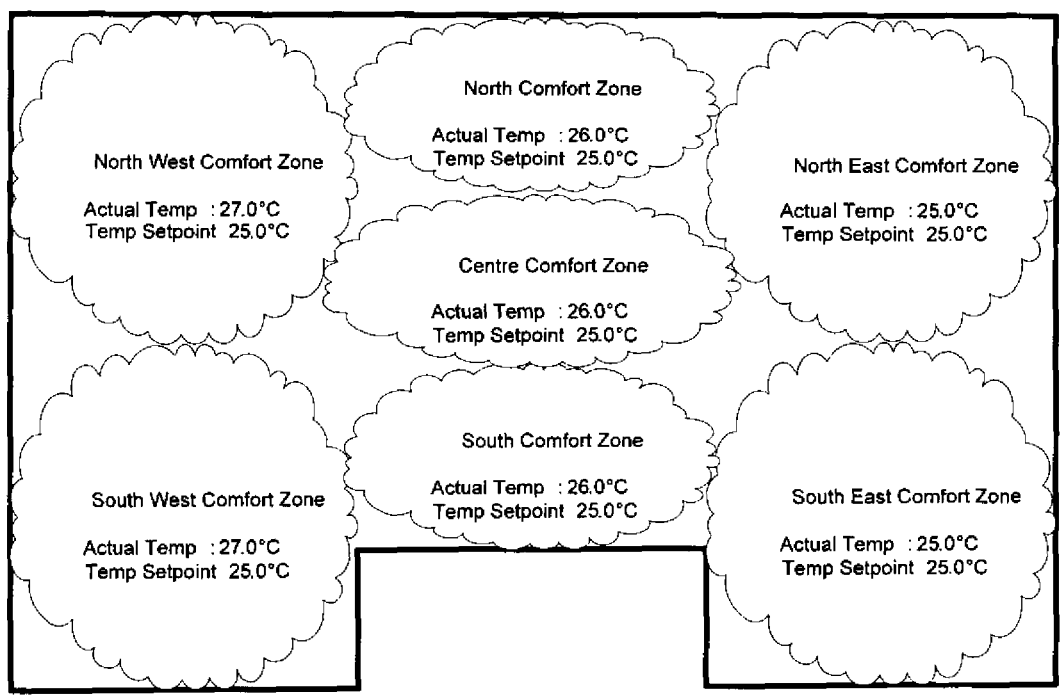
FIG. 4 provides a graphical overview of comfort zones according to one embodiment.

A HVAC comfort zone is a physical area in a building which is explicitly and separately controlled for heating and cooling. It resides within a single logical space in the building but may span multiple levels e.g. an Atrium. A HVAC comfort zone has one or more operating parameters (such as measured temperature, temperature set point, measured humidity, humidity set point, etc.) that together form an indication of the level of comfort for that zone. Often a HVAC comfort zone is bounded by one or more physical barriers, such as walls or partitions (see FIG. 3), but it is also possible that a HVAC comfort zone has no physical barriers (see FIG. 4).

As noted, a HVAC comfort zone provides a relationship between the equipment providing conditioned air delivery in the building and the physical areas being controlled. This relationship is used to help diagnose and maintain a building. It is important to note that even though each HVAC comfort zone only has one temperature (and possibly humidity) measurement and set point that there could be multiple pieces of unitary air handing equipment supplying that comfort zone.

A practical example of the use of HVAC comfort zones is responding to an occupant request. If an area in the building is being reported as uncomfortable, the building operator could examine the HVAC comfort zones within the area and adjust the control settings as appropriate. Facility model items are able to be visualized within a tree structure, noting that each item describes a location in terms of relationships with other locations (for example in terms of containment. FIG. 5 visualizes two tree structures for an exemplary facility model. The tree on the left side shows the facility model, including building, level and HVAC comfort zones, while the tree on the right side shows the HVAC supply zones, floors and HVAC comfort zones. This is not ideal, in the sense that the two separate visualizations have duplication of the level nodes. The "Level 1" node in both models represents the same physical level in the building, however it is found under different parent node types, confusing the models. As an alternative, FIG. 6 shows these structures merged into a single hierarchy. In this case, HVAC supply zones are duplicated throughout the hierarchy; however they represent a single entity in the system.

Duplication of nodes in the hierarchy becomes problematic when considering convenient navigation and operator Scope of Responsibly assignment. However, it will be appreciated from discussion herein that use of the equipment model allows for HVAC supply zones to be implicitly derived. This is discussed further below.

Modeling Equipment in an HVAC System

As discussed further above, some embodiments of the present invention include the configuration and implementation of an equipment model, being a model comprising a plurality of equipment model items that each respectively describe pieces of equipment. The manner by which they describe equipment is determined by specific standards, so as to provide context in a BMS.

In terms of defining what is meant by a "piece of equipment", there are multiple approaches for defining boundaries. For example, a piece of equipment may be defined to include:

All mechanical and sensors/actuators that come together to perform one logical function e.g. an Air Handling Unit includes dampers, fans, filters, coils, smoke sensors, etc.

Smaller "sub-equipment" e.g. an Air Handling Unit is made up from a supply air fan (which contains the speed sensor and the speed controller), heating coil (which contains the valves, pumps and flow meters), etc.

All individual sensor/actuator/valves are considered individually as piece of equipment, e.g. an Air Handling Unit is made up from the fan speed sensor equipment, the fan speed controller equipment, the heating coil value position sensor equipment and the heating coil valve actuator equipment, etc.

In the context of this document, the term "equipment" is used to describe a mechanical device that has electrical/electronic sensors and/or actuators that control and provide feedback about the status of the device. The term can also be considered to describe a collection of smaller components that are brought together that provide a unit of control over the system of which they are a part. Examples of key HVAC equipment are boilers, chillers, air handling units, air terminal units, fans and pumps. Examples of smaller components that can also be considered equipment are the fans/fan motors, dampers, valves, coils, sensors, etc that come together to form an Air Handling Unit.

Equipment is monitored and controlled by one or more microprocessor based controllers that have been programmed with the appropriate control strategy and with the building management system in mind. Key to this are two critical concepts:

Alarming. When an equipment control strategy is applied it is important that the limitations of the equipment or system are understood and alarm conditions defined to alert the building operator(s) of informational, important or critical events. Alarms generated by the controllers must be able to be identified as belonging to the equipment or equipment system and the individual sensor or actuator that generated the alarm. Alarm counts must aggregated in the building management system at the equipment and equipment system level such that the building operator can gain an overview of the state of the equipment and equipment systems within the facility.

Point Roles. As discussed above, when defining the control strategy for a HVAC system, the building management system and its operators must be considered as the sensor and actuator values are exposed to them and should be able to be understood given the current context. In order to standardize and simplify the understanding of equipment and equipment systems, the concept of a "point role" is critical. Consider, for example, a BACnet Analog Output called CP-AO1. The name of this point and its value (for example a PresentValue of 24.50° C.) are meaningless unless some context is provided. Point-roles provide this context—if "Supply Air Temperature Sensor" is set as the point role, the value 24.50° C. starts to have meaning. If we then associate this point with a given air handling unit then a building operator can make decision if that value is appropriate.

In addition a meaningful point name such as "saTemp" can be applied to this point. All points prefixed with "sa" could be assumed by the building management system to belong to a category of information known as "Supply Air". The categorization of points can not only help better visualize a piece of equipment, it allows the building management system more understanding and awareness of the information it is monitoring and controlling.

Extending from this, in the present embodiment equipment model items have the following main attributes:

Location: Each piece of equipment is physically located somewhere in the facility and thus there is a direct link from equipment to location.

Named data access: Each piece of equipment has named parameters that provide read/write access to data points. The name of each parameter is ideally derived from the role of the point (point-role) that is providing the data access. As discussed above, this point-role concept is a critical feature of the equipment model, as it provides inherent understandable context to data associated with an equipment model item.

Alarming: Equipment parameters can raise alarms based on certain criteria (as configured in the controller or at runtime). These alarms not only belong to the underlying data point, but also belong to a piece of equipment.

Alarm aggregation: In some embodiments, alarms counts are aggregated using defined alarm group relationships between items in the equipment model.

Mode: All pieces of HVAC equipment can be considered to have a mode of operation. For example a VAV is often considered to be in Occupied or Unoccupied mode (where the temperature set points and control strategy in the controller changes to reflect that a person is occupying the HVAC comfort zone).

Scheduled Mode: The mode of a piece of HVAC equipment is often scheduled in advance to take advantage of energy efficiency and cost savings based on HVAC comfort zone usage.

Relationships: Equipment has relationships with other pieces of equipment and with HVAC comfort zones. This is discussed further below.

Other embodiments use a reduced selection of these, optionally in combination with further attributes.

Equipment Relationships

Relationships exist between equipment systems, equipment and HVAC comfort zones. In the present embodiments, two categories of relationship are considered:

Containment Relationships. An equipment system can contain one or more pieces of equipment. A piece of equipment can contain zero or more pieces of equipment. It is possible that for some types of equipment there are zero pieces of contained equipment, thus the piece of equipment directly contains the data points (i.e. point roles) that describe the sensor and actuators.

Supply Relationships. Equipment systems can supply other equipment systems or equipment. Furthermore, equipment can supply other equipment or HVAC Comfort Zones.

For the present purposes, it is assumed that a contained piece of equipment does not participate in the "supplies" relationship.

Figure 7:
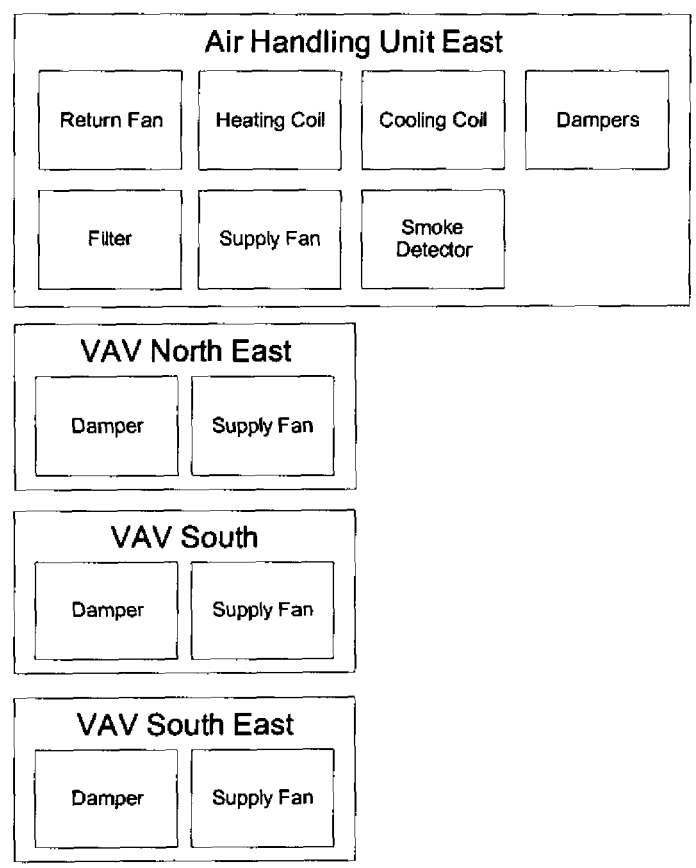
FIG. 7 shows equipment containment relationships according to one embodiment.

FIG. 7 provides an exemplary visualization of a "contains" relationship for an AHU and its associated VAVs. In this example, sub-equipment is contained within the bounds of the equipment entities.

Figure 8:
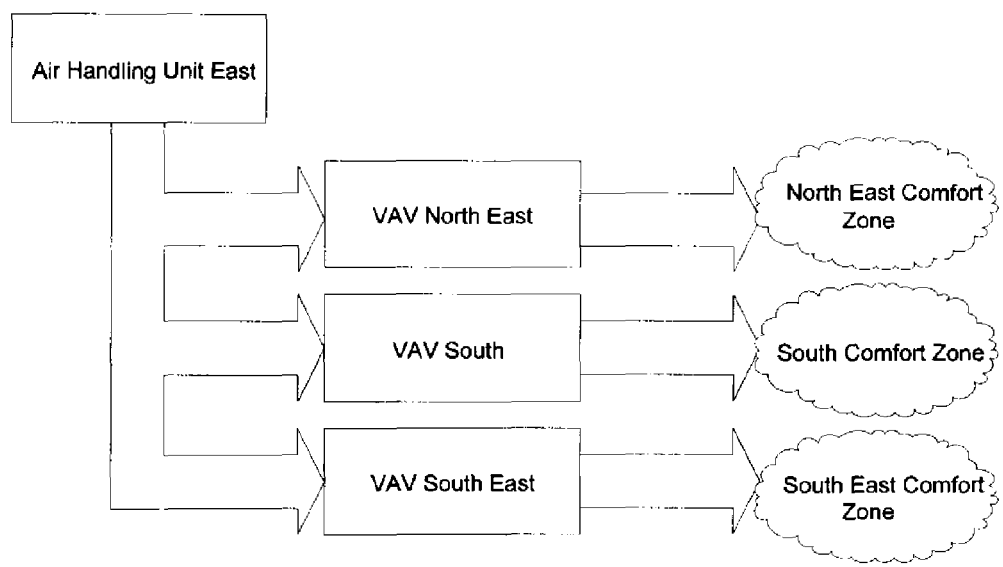
FIG. 8 shows equipment supply relationships according to one embodiment.

FIG. 8 shows a "supplies" relationship for an AHU, its associated VAVs and their associated HVAC comfort zones. The supplies relationship allows the system to derive the HVAC supply zone(s) through direct navigation from HVAC Comfort Zone to Equipment.

The "supplies" relationship is particularly useful for assisting with the analysis of faults, and modeling for system behavior in response to faults and/or equipment downtime. This extends to equipment modeling for other HVAC systems in terms of a broader category of relationship, being "reliance" relationships. Such relationships describe how one price of equipment is reliant on another (i.e. the "supplies" relationship is an example of a "reliance" relationship). For example, in the context of a DVM system, "reliance" relationships can describe relationships between cameras, camera servers, administration servers, and the like.

Link Between Facility Model and Equipment Model

As discussed, in terms of the facility model, a category of facility model item (comfort zones) describes locations uniquely serviced by respective pieces of HVAC equipment. Additionally, at least one category of equipment the equipment model items include data indicative of a location uniquely serviced by that piece of equipment (again in the form of comfort zones). In this manner, comfort zones provide an important link between the facility model and equipment model, allowing for those models to be combined.

Figure 9:
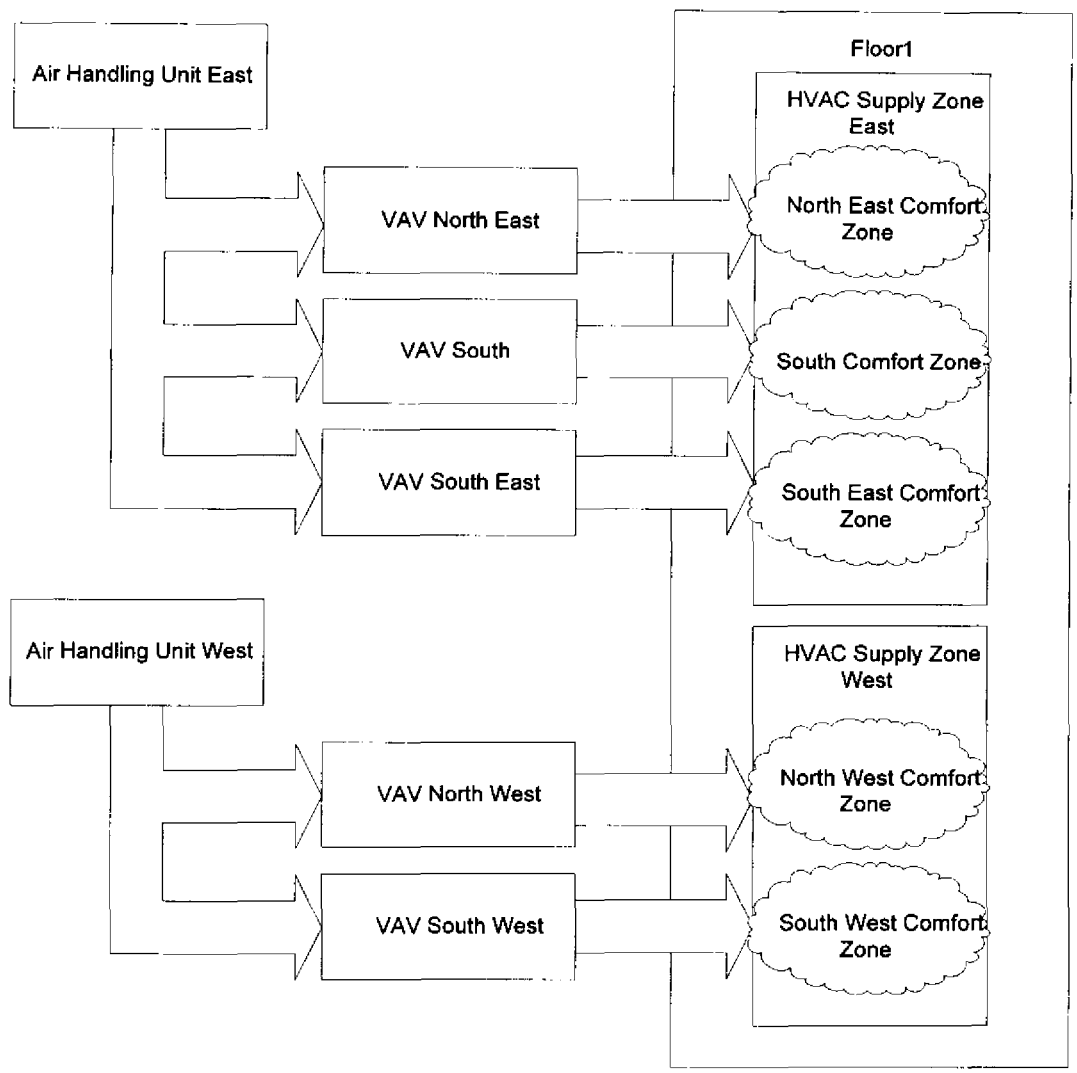
FIG. 9 provides an exemplary visual representation of a combined equipment and facility model.

FIG. 9 provides a visual representation of the relationship between the equipment model and the facility model. Key points of interest are the one-to-one relationship between a piece of equipment and a HVAC comfort zone, and that a HVAC comfort zone is only ever supplied by one piece of equipment.

Equipment Systems

In some embodiments, similar key pieces of equipment are grouped together to form a single logical system known as an Equipment System. An equipment system comprises of one or more pieces of equipment and individual point roles that work together to provide a single service to the building, for example, hot water or conditioned air. In practice, a typical hot water system is comprised of more than one boiler (equipment), pump (equipment) and miscellaneous sensors and valve actuators (point roles).

As context, up to this point, the equipment model discussion has not included boilers and chillers and how they fit into these the equipment model. Consider the tree structure of FIG. 10 as representing an exemplary floor in a building. One approach for adding boilers and chillers to the model is to the boilers and chillers as pieces of equipment and set the supplies relationship to the appropriate AHU. This is shown in FIG. 11. However, this visualization leads to duplication of nodes and confusion of the model. This is rectified by grouping similar equipment into equipment systems, as shown in FIG. 12.

In some embodiments, three systems are defined:

Air Distribution System: This contains all equipment directly related to moving air within the building.

Hot Water System: This contains all equipment directly related to creating and moving hot water within the building.

Chilled Water System: This contains all equipment directly related to creating and moving chilled water within the building.

As systems are a collection of equipment, some embodiments adopt an approach whereby each piece of equipment (i.e. equipment model item) includes meta-data that defines the system to which it belongs. One embodiment builds the three main systems (air distribution, hot water and chilled water) as equipment items, and implements those as the top level nodes under the an equipment model root system point. Equipment that does not fit into a pre-defined system is optionally grouped into an "other" system.

Figure 13A:
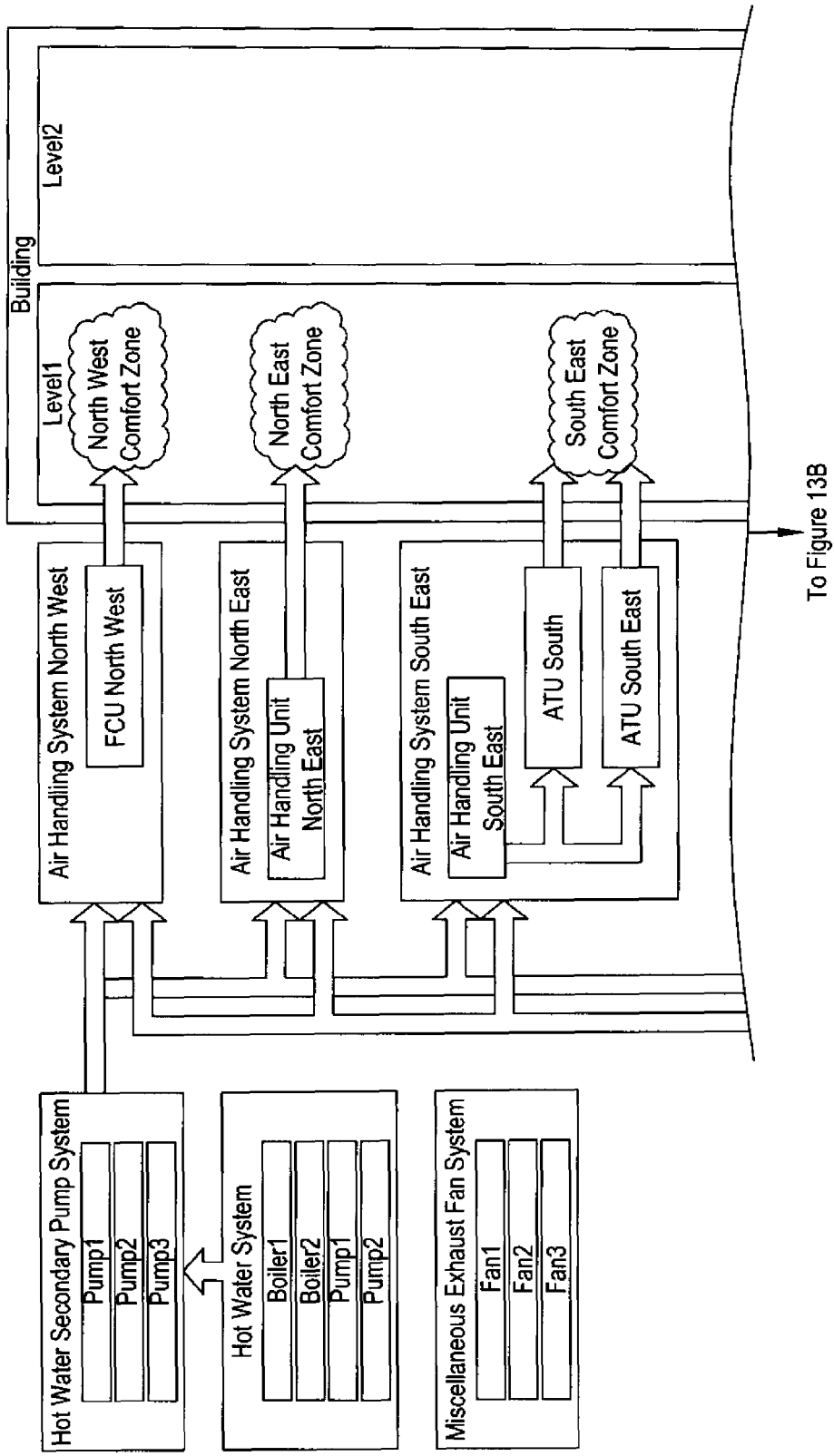
FIG. 13 provides an exemplary visual representation of a combined equipment and facility model.
Figure 13B:
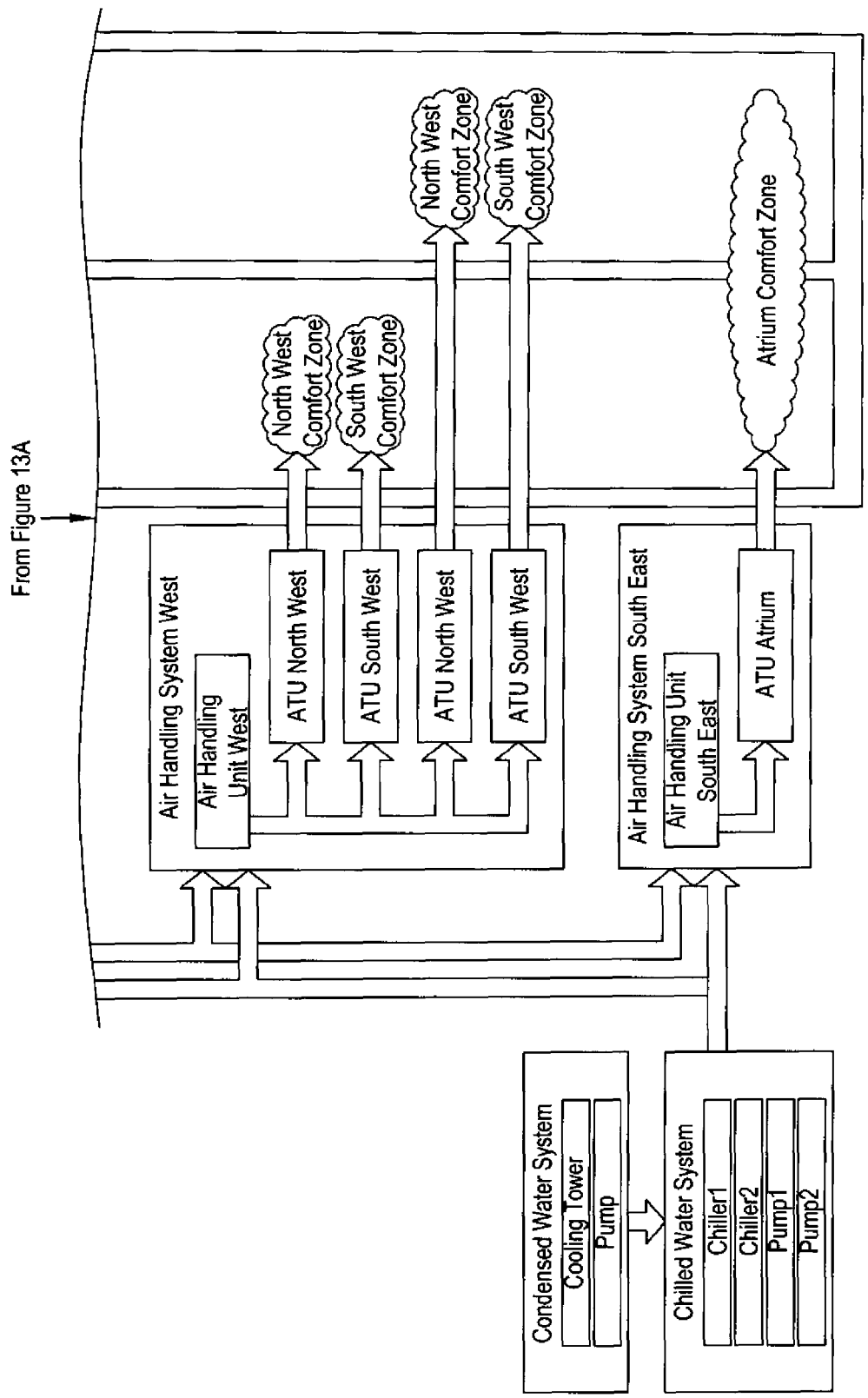

FIG. 13 provides an exemplary visual representation combining equipment, equipment systems, and facility model data. In this diagram, boxes represent either systems or pieces of equipment (defined by the creation of equipment model items), arrows show the supply relationships, and boxes-within-boxes show containment relationships. It is important to note that equipment containing other pieces of equipment art not shown, and point roles are not shown. Furthermore, although HVAC supply zones are not shown, it will be appreciated that these may be inferred by grouping HVAC comfort zones by system.

In the context of this diagram, two air handling scenarios are worth considering in further detail. These are discussed below.

Firstly, there is a possible scenario where an air handling unit supplies a large open area that has multiple temperature sensors but there are no unitary controllers providing comfort zone control. This might occur on a factory floor or in a warehouse situation. In this scenario, a preferred control strategy for the air handling unit is either averaging the sensor values or using the maximum sensor value in order to control the supply air temperature. There are two ways in which this system could be modeled:

i. The AHU is considered to be supplying a single large comfort zone with a single temperature sensor value (the average/max).

ii. The AHU is considered to be supplying multiple comfort zones. To model this a "temperature sensor" piece of equipment would be created that allows the one to one relationship between equipment and HVAC comfort zone to remain.

The second scenario occurs where an AHU has multiple sensors and there is a limited type of local control that is performed by the AHU e.g. local reheat only. In this scenario, a preferred strategy is for the re-heater will be modeled as an ATU.

Further Comments Regarding Automated Visualization

The present diagrams should not be taken as limiting the form of visualization achieved using the present models. In particular, whereas the present diagrams show simple block and tree structures, the nature of the present BMS modeling allows for complex automated visualization creation.

In general terms, the present technology allows for a UI component to build displays based on data in the equipment and/or facility models, given the standardization of items in those models and context that provides. That is, given that the manner by which the equipment and facility model provide predictable meaning to point roles, and meaningfully describe relationships between areas/components, it is possible to code processes that are able to access and utilise BMS data based on generic queries, without having to know specifics about individual data points in a system For example, a UI component may operate as follows:

Receive a request to build a visualization for a client. This may occur when a BMS user interface is launched, or in response to user interaction with such an interface.

Identify categories of equipment required for the visualization (e.g. ATUs or AHUs). For example, this may be based on the context of the request.

Identify a predefined visualization template for the identified category or categories of equipment. For example, there may be a template predefined for visualization of any given ATU, a template for displaying ATUs and AHUs in terms of supply relationships, and so on.

Using the visualization template, build a visualization by populating the template with data extracted from items in database 102. For example, the visualization template sets out locations for displaying the item name, and for displaying values provided by each point role. The visualization template may also include logic for arranging items in terms of relationships or the like.

For example, one embodiment provides a method for visualizing a piece of HVAC equipment. Database 102 includes, for one or more categories of HVAC equipment, a respective image file for graphically representing equipment of that category (for example an image that schematically depicts an AHU). That image file is associated with data indicative of locations at which point role values are to be displayed relative to the image file. In response to a request to view information regarding a particular AHU, the UI component builds a visualization including that image file, and the point role values for the particular AHU. In another embodiment, the UI component provides a general navigation interface foe an HVAC system.

Conclusions and Interpretation

It will be appreciated that the above disclosure provides improved systems and method for configuring a BMS. While a facility model provides a hierarchical model of the physical topology of a facility and its buildings, it is clear from the discussion here that it is not the most effective way to describe the complete physical model of a building when considering the needs of the building operator. Separately modeling the equipment and/or equipment systems in a building is particularly helpful for supporting the tasks required by building operators.

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., an liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one or more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be includes in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagrams only show a single processor and a single memory that carries the computer-readable code, those in the art will understand that many of the components described above are included, but not explicitly shown or described in order not to obscure the inventive aspect. For example, while only a single machine is illustrated, the term "machine" or "device" shall also be taken to include any collection of machines that individually or jointly execute a set (or multiple sets) of instructions to perform any one or more of the methodologies discussed herein.

At least one embodiment of various methods described herein is in the form of a computer-readable carrier medium carrying a set of instructions, e.g., a computer program that are for execution on one or more processors, e.g., one or more processors that are part of building management system. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media, a medium bearing a propagated signal detectable by at least one processor of one or more processors and representing a set of instructions that when executed implement a method, a carrier wave bearing a propagated signal detectable by at least one processor of the one or more processors and representing the set of instructions a propagated signal and representing the set of instructions, and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The claims defining the invention are as follows:

1. A method for configuring a building management system (BMS), the method including;
    storing a repository of equipment model templates in a memory, wherein each template defines a data organizational framework that is configured to describe a category of equipment in a building system, one or more data points associated with a piece of equipment belonging to that category, the roles of those data points, and relationships with one or more further pieces of equipment for which equipment model templates are defined;
    a user defining a plurality of equipment model items using the repository of equipment model templates via a user interface that is in operative communication with the memory, such that each equipment model item describes a specific physically installed piece of mechanical equipment in terms of data as required by the template, wherein for a given physical installed piece of mechanical equipment, the defining includes:
        (i) selecting, from the repository of equipment model templates via the user interface, the category of equipment that describes the physical installed piece of mechanical equipment; and
        (ii) for each of the one or more data points associated with the selected category of equipment, associating via the user interface the data point with a physical installed control level item associated with the physical installed piece of mechanical equipment, being a control level item from which data is received by the BMS, such that the BMS is configured to attribute data receive from that control level item with that data point;
    constructing an equipment model including the defined equipment model items, wherein the equipment model provides for automated visualization of the equipment model items defined to represent physical installed pieces of mechanical equipment in terms of location and relationships; and
    using the equipment model to automatically visualize the equipment model items defined to represent physical installed pieces of mechanical equipment in terms of location and relationships on a display.

2. A method according to claim 1 wherein the relationships with the one or more further pieces of equipment are defined in terms of reliance relationships and containment relationships.

3. A method according to claim 1 wherein, for at least one category of equipment, the template is configured to additionally describe a serviced area, wherein the serviced area is additionally defined in a facility model that describes physical locations within one or more buildings in respect of which the BMS is configured to operate.

4. A method according to claim 1 wherein the equipment model templates include a plurality of HVAC templates for respectively describing categories of equipment in an HVAC system.

5. A method according to claim 4 wherein for at least one category of equipment in the HVAC system, the template is configured to additionally describe a region uniquely serviced by the piece of equipment.

6. A building management system (BMS) comprising:
    a physical memory for storing a repository of non-transitory data that is indicative of plurality of equipment model items, these equipment model items based on predetermined equipment model templates, such that each equipment model item describes a specific piece of equipment in terms of a category of equipment selected from a set of available predefined categories of equipment, one or more data points associated with a piece of equipment belonging to that category, the roles of those data points, and relationships with one or more further pieces of equipment;
    a user interface that accepts input from a user to define each equipment model item to describe a specific physical installed piece of mechanical equipment in terms of data as required by one of the predetermined equipment model templates, wherein for a given physical installed piece of mechanical equipment, the user interface is configured to accept input to:
(i) select, from the repository of equipment model templates, a category of equipment which describes the physical installed piece of mechanical equipment; and
(ii) for each of the one or more data points associated with the selected category of equipment, associate the data point with a physical installed control level item associated with the physical installed piece of mechanical equipment, being a control level item from which data is received by the BMS, such that the BMS is configured to attribute data receive from that control level item with that data point; and
a visualization module including a physical display for automated visualization of the equipment model items defined to represent physical installed pieces of mechanical equipment in terms of location and relationships.

7. A BMS system according to claim 6 wherein the relationships with the one or more further pieces of equipment are defined in terms of reliance relationships and containment relationships.

8. A BMS system according to claim 6 wherein, for at least one category of equipment, the template is configured to additionally describe a serviced area, wherein the serviced area is additionally defined in a facility model for the BMS, wherein the facility model that describes physical locations within one or more buildings in respect of which the BMS is configured to operate.

9. A BMS system according to claim 6 wherein the equipment model templates include a plurality of HVAC templates for respectively describing categories of equipment in an HVAC system.

10. A BMS system according to claim 9 wherein for at least one category of equipment in the HVAC system, the template is configured to additionally describe a region uniquely serviced by the piece of equipment.

11. A method for modeling an HVAC system, the method including:
storing a facility model in a building management system (BMS), the facility model includes data indicative of a plurality of facility model items which respectively describe physical locations within a building environment in terms of a category of location, and relationships with other locations, wherein a category of facility model items describe locations uniquely serviced by respective pieces of HVAC equipment, wherein the facility model is configured to provide a graphical representation of the facility model items via a tree structure;
storing an equipment model in the building management system (BMS), the equipment model includes data indicative of plurality of equipment model items, each equipment model item describing a specific piece of HVAC equipment in terms of a category of equipment selected from a set of available predefined categories of equipment, one or more data points associated with that piece of equipment, the roles of those data points, and relationships with one or more further pieces of equipment, wherein for at least one category of equipment the equipment model items include data indicative of a location uniquely serviced by that piece of equipment, wherein the equipment model is configured to provide a graphical representation of the equipment model items via a tree structure;
storing links in the building management system (BMS) that link the facility model and equipment model by the locations uniquely serviced by respective pieces of HVAC equipment; and
display a graphical representation of the facility model items and equipment model items on a display via a common tree structure.

12. A method according to claim 11 wherein the relationships with the one or more further pieces of equipment are defined in terms of reliance relationships and containment relationships.

13. A method according to claim 11 including a step of automatically visualizing the HVAC system on the display based on information in the facility model and equipment model.

14. A BMS system according to claim 6 comprising:
data indicative of a plurality of facility model items which respectively describe physical locations within a building environment in terms of a category of location, and relationships with other locations, wherein a category of facility model items describe locations uniquely serviced by respective pieces of HVAC equipment; and
data indicative of plurality of equipment model items, each equipment model item describing a specific piece of HVAC equipment in terms of a category of equipment selected from a set of available predefined categories of equipment, one or more data points associated with that piece of equipment, the roles of those data points, and relationships with one or more further pieces of equipment, wherein for at least one category of equipment the equipment model items include data indicative of a location uniquely serviced by that piece of equipment;
such that the facility model items and equipment model items are linked by the locations uniquely serviced by respective pieces of HVAC equipment.

15. A BMS system according to claim 14 wherein the visualization module is configured to automatically visualize the HVAC system on the display based on information in the facility model items and equipment model items.

16. A computer system according to claim 14 wherein:
a facility model is configured to provide a graphical representation of the facility model items via a tree structure, and an equipment model is configured to provide a graphical representation of the equipment model items via a tree structure, such that the facility model and equipment model being linked by the locations uniquely serviced by respective pieces of HVAC equipment to provide a graphical representation on the display of the facility model items and equipment model items via a common tree structure.

\* \* \* \* \*